April 18, 1967  C. E. VALENTE  3,314,357
MACHINE FOR MAKING CREAM-COFFEE
Filed Aug. 10, 1965  2 Sheets-Sheet 1

April 18, 1967  C. E. VALENTE  3,314,357
MACHINE FOR MAKING CREAM-COFFEE
Filed Aug. 10, 1965  2 Sheets-Sheet 2

United States Patent Office 3,314,357
Patented Apr. 18, 1967

3,314,357
MACHINE FOR MAKING CREAM-COFFEE
Carlo Ernesto Valente, Via G. Ventura 5,
Milan, Italy
Filed Aug. 10, 1965, Ser. No. 475,162
4 Claims. (Cl. 99—282)

This application is a continuation-in-part of application Ser. No. 240,062, filed Nov. 26, 1962, now abandoned, and of application Ser. No. 140,609, filed Sept. 25, 1961, now Patent No. 3,230,974, and relates to coffee-making machines and more particularly to coffee-making machines for so-called "cream of coffee," in which the dispensed cups of coffee have at their surface a thick golden froth. Hereinafter, for convenience, "cream of coffee" will be referred to simply as "coffee" and the unqualified word "coffee" will always mean "cream of coffee."

Such a drink is obtained by causing hot water to percolate through a measure of ground coffee at a pressure of about 5–8 atmospheres and a temperature of 90°–98° C.

In practice, one of the greatest difficulties in order to obtain this result is that of maintaining the water in the infusion chamber at a constant temperature selected between 90° and 98° C. In a conventional coffee-making machine with a boiler and one or more infusion heads, it has been found that although the water in the boiler may be maintained at a temperature, say $T°$, the temperature of the infuser walls will be different, say $t°$, and $t° < T°$. In a conventional coffee-making machine as illustrated, for example, in U.S. Patent No. 3,110,243, each infusion head consists of a piston sliding in a cylinder, the lower chamber of which, closed at its lower end by means of a filter, containing the ground coffee, acts as an infusion chamber. In such an infusion head, the mass of metallic material comprising the walls (i.e., the infuser walls) is great and, accordingly, the infuser walls have the capacity to gain or to lose heat very rapidly.

When coffee is prepared, water at $T°$ is passed into the infusion chamber having a wall temperature of $t°$, wherein $t° < T°$, and there is a change in the temperature $T°$, to say $(t+x)°$, where $t° < (t+x)° < T°$. Because there has been a heat transmission, from the water to the infuser walls, the infuser walls now have a temperature of $(t+x)°$.

If $(t+x)°$ is between 90° and 98° C., the dispensed cup of coffee is optimum in flavor and temperature. If $(t+x)°$ is less than 90° C., the dispensed cup of coffee is not acceptable in flavor and temperature.

Assuming that $(t+x)°$ is the optimum temperature for infusion and that the machine is being used only at relatively lengthy intervals between infusions, the wall temperature of the infusion chamber will decrease after each and before the next infusion to $t°$ from $(t+x)°$ and in each case the coffee dispensed will be the same in flavor and temperature. If, on the other hand, the machine is used very often, with very short intervals between infusions, the wall temperature of the infusion chamber no longer decreases to $t°$, and thus, after "$n$" number of infusions, the infuser wall temperature will be $(t+nx)°$, wherein $(t+nx)° > 98°$ C. From that time, due to the increase in temperature above the optimum value, the flavor of all dispensed coffee, which follows, will be affected ("burnt" coffee).

In order to overcome this problem of temperature, various solutions have been proposed. According to a first proposed solution, the temperature $T°$ of the water, which enters the infusion chamber is caused to decrease as soon as the temperature of the infuser walls rises. According to a second proposed solution, the temperature of the infuser walls is maintained at a value very near to $(t+x)°$ and, therefore, not as far below $T°$ as would be $t°$. Thus, according to the first mentioned proposal, it has been proposed (see U.S. Patent No. 3,110,243) to provide for each infusion head a container of water situated inside the boiler, the top of the container being connected internally to a fresh water inlet duct contained in the body of the head and fed from outside of the machine. A second outlet duct leads from the bottom of the container to the infusion chamber. The capacity of the container is about twice that of the infusion chamber. According to the second proposed solution, a vapor or warm water jacket around the infusion chamber is provided. Up to this time only partial success has been achieved by means of these proposals.

A specific example of the first type of proposed solution is the subject of Swiss Patent No. 250,619, in which a conventional boiler and each of three infusion heads are connected in such manner as to provide a closed circuit for the hot water through the infusion head bodies, each infusion head having a head cock, the opening of the head cock connecting the closed circuit with the infusion chamber.

Thus, when no coffee is being dispensed, each infusion head has a constant temperature but not all the heads have the same temperature, the heads having temperatures decreasing in the direction of the hot water circulation (i.e., in the direction of the arrows in FIGURE 1 of said Swiss patent). Under these circumstances, it is not possible to maintain the walls of each infusion chamber at a temperature between 90 and 98° C. and feed each infusion chamber with hot water at a pressure of 5–8 atmospheres, unless this pressure exists in the boiler. However, such a pressure is not in accordance with the water pressure requirements of coffee-houses, refreshment rooms, etc.

Moreover, when cups of coffee are being dispensed, particularly in rapid succession, not even the water temperature inside the boiler is constant, since during this period the boiler is fed with a large quantity of fresh water. It is thus clear, as experiments have proved, that the above-mentioned problem of temperature control is not overcome by use of the known machines.

It is a principal object of the present invention to provide a construction capable of maintaining the optimum temperature of the infusion water inside the infusion chamber, both in the case of infusion at lengthy time intervals, and in the event the dispensing of cups of coffee rapidly succeeds one another numerous times.

Another object of the present invention is to provide a new and improved coffee making machine which provides a better quality coffee brew and more complete exhaustion of the coffee powder than those heretofore known.

A further object of the present invention is to provide such a machine with an improved dispensing and infusion control unit, which is easier to manufacture and operate than those heretofore known.

Other and further objects of my invention will become readily apparent to persons skilled in the art, from a consideration of the following description when taken in conjunction with the drawings, wherein.

In the drawings, the same characters of reference are used wherever feasible to designate the same or similar parts throughout the several figures thereof.

Figure 1:
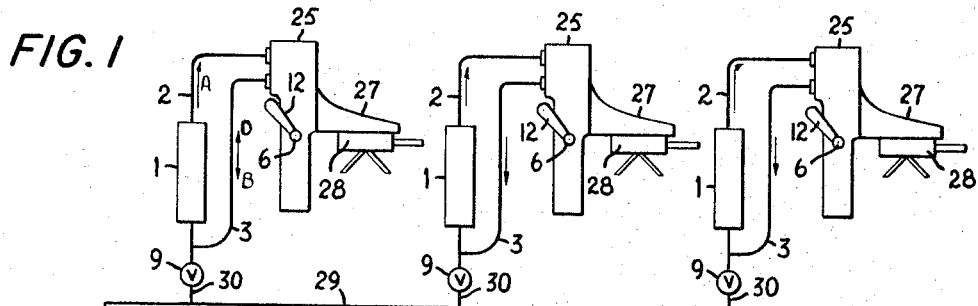
FIG. 1 is a diagrammatic illustration of a coffee-making machine in accordance with the present invention.
Figure 2:
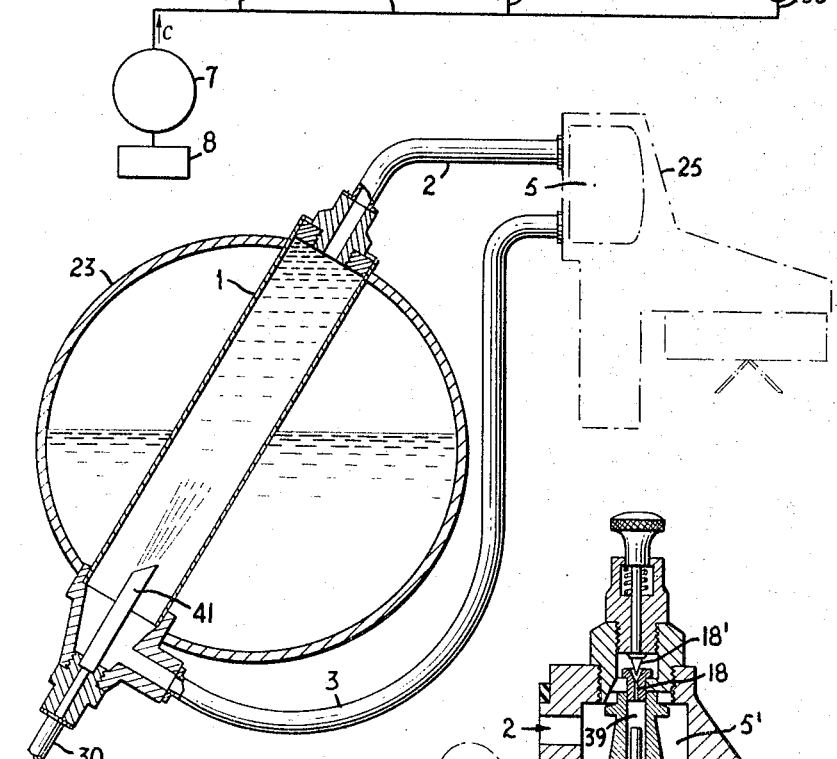
FIG. 2 is an enlarged cross-section taken through one of the heat exchangers with portions in elevation.

Referring now to FIG. 1 and FIG. 2, there are illustrated three tubular heat exchangers 1 for storing the water intended for the coffee infusion. The water in the heat exchanger 1 is heated indirectly by locating the heat exchanger inside a steam boiler 23, as illustrated in FIG. 2. The exchangers 1 may be disposed vertically, as shown in the diagrammatic FIGURE 1, or, if desired, inclined relative to the vertical as shown in FIG. 2. From the frame (not shown) of the coffee-making machine are supported separately (FIG. 1) three hollow bodies 25, each of which has a first chamber 5' shown in FIG. 2 in broken lines, which at the top communicates with the upper end of the corresponding heat exchanger 1 through a pipe 2, and at the bottom communicates with the lower end of heat exchanger 1 through another pipe 3, both of the pipes being located outside of the boiler 23. Thus are provided three separate closed circulation thermosiphon circuits for extracting heat from the boiler 23, heating circulating water and thus preparing the hot infusion water.

With further reference to FIGS. 1 and 2, a supply pipe 29 from a fresh water source, not shown, is provided with a branch pipe 30 for each of the heat exchangers for the recirculation circuits. In each branch pipe is a non-return valve 9. If the fresh water source supplies, as is usual, water under a lower pressure than the full pressure needed (8–10 atm.) for the dispensing of coffee, a pump 7 adapted to force water from the source and into the heat exchangers is provided. It will be appreciated that such a water pump must supply the water at a pressure at least equal to pressure needed for coffee dispensing. Pump 7 is usually provided with an electric motor 8 to drive it and means (not shown in FIG. 1) for starting and stopping electric motor 8 when the valve means for controlling flow through the coffee powder in bell 28 is opened and closed respectively. The means for starting and stopping the electric motor will be subsequently described. When boiler 23 is in operation, in practice it is at a temperature of, for example, about 115° C. and when no coffee is being dispensed (i.e., when the valve, which controls the water flow from the first chamber 5' to the infusion chamber 5, is closed), the temperature of the water which enters the first chamber 5' from the heat exchanger 1 through pipe 2 (as indicated by arrow A) is about 108° C. and the temperature of the water which leaves chamber 5' and flows again into the heat exchanger 1 through pipe 3 (as indicated by arrow B) is about 100° C. The water in the closed recirculation circuit flows in a clockwise direction, as shown by the arrows A and B; the walls of infusion chamber 5 are then at an optimum temperature of between 90 and 98° C. If the infusion water flowing into the infusion chamber 5 would come only from the pipe 2 in a period when coffee is being dispensed, especially when being dispensed frequently and at short intervals, the temperature of the infusion chamber walls would increase somewhat. However, when coffee is being dispensed, the thermosiphon recirculation ceases. The pump 7 injects (arrow C) an amount of fresh (cold) water into the heat exchanger corresponding to the amount of water dispensed as part of the coffee as is illustrated in FIG. 2. This cools the water contained in the pipe 3 which, resultingly, is now forced upward in counter clockwise direction (as shown by arrow D) into the first chamber 5', wherein it mixes with the hotter water in chamber 5'. The temperature of the resultant water mixture stays in the optimum range of 90 to 98° C. during the infusion and dispensing stage.

When valve means 9 is closed and, consequently, the operation of pump 7 is stopped in order to remove bell 28, empty it of spent coffee grounds, refill it with fresh coffee grounds and connect it again to body projection 27, the time spent doing this, even if very short, is sufficient for the original temperature condition to be restored in the heat exchanger together with the recirculation and, thus, also the original temperature of the infusion chamber walls is restored. It follows that each succeeding cup of coffee, in all cases, is prepared under identical conditions, regardless of how often the drink is made and dispensed.

With further reference to FIG. 2, in order to prevent eventual difficulty in regulating or controlling the temperature, according to the present invention, the delivery end of each branch pipe 30 may be in the shape of a nozzle 41 projecting into the interior of the heat exchanger. Thus, the fresh water, during the infusion and dispensing stage, cannot immediately enter pipe 3, but will first go some distance upward along the length of the heat exchanger and thus be somewhat heated. It will be appreciated that, thus, the cooling effect of the water jet from nozzle 41 can be regulated by altering the relative position of the outlet of the nozzle inside the heat exchanger.

Figure 3:
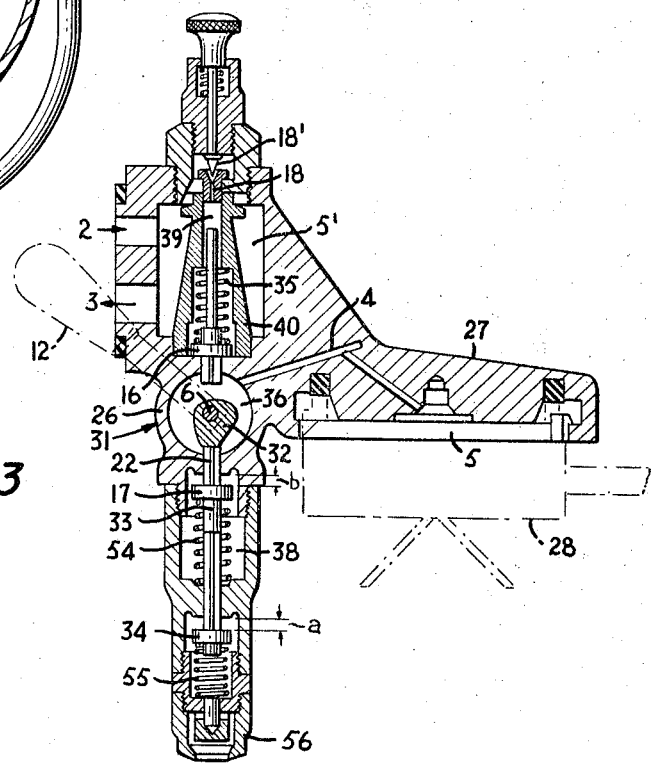
FIG. 3 is a median fragmentary sectional view through the body of one of the dispensing heads on an enlarged scale.

Referring now to FIG. 3, on each of the bodies 25 is provided a lateral projection 27, integral with the corresponding body for connection to a bell (strainer holder) 28, defining thus in known manner an infusion chamber 5 (FIG. 3) adapted to contain the coffee powder. Means are provided defining a conduit 4 for connecting infusion chamber 5 with said first chamber 5' and valve means for controlling flow through said conduit in operation, i.e. when at least a coffee-cup is to be dispensed, wherein these said valve means are actuated by means of a lever 12, pivotally mounted for rotation about the axis 6, journaled in the walls of the body 25, and later described.

With further reference to FIG. 3, valve means 31 for controlling flow through conduit 4 is adapted to be actuated by means of lever 12, shown mounted on each of the coffee-making machines diagrammatically illustrated in the FIG. 1. Valve means 31 (which is described also in applicant's copending U.S. application S.N. 140,609, filed Sept. 25, 1961, now Patent No. 3,230,974) for connecting the first chamber 5' with the infusion chamber 5 comprises a second chamber 36, located in a downward extending projection 26 of the body, in which is mounted upon pivot 6, cam 32 which is actuated through lever 12, lever 12 being located externally of the body. This cam is movable between a first and a second position for actuating valves 16 and 17 in dependence upon the position in which the cam 32 is disposed. In the position shown in FIG. 3, cam 32 is illustrated as having unseated valve 17 which has a valve actuating portion 22 and a valve stem 33 to which is attached valve 34, while the valve 16 is biased to a seated position by a spring 35, and, thus, no water from the recirculation circuit enters the chamber 36. The second chamber 36 communicates with a third chamber 38, located in downward projection 26 of the body. When the cam 32 is in its other position, springs 54 and 55 seat valves 17 and 34 to a seated position in which the discharge of water from the machine through nozzle 56 is cut off. At this time, valve 16 is in an unseated position. In order to provide water for chamber 36, the first chamber 5' communicates with a chamber 39, in a fluidtight element 40, only through a passageway 18 controlled by needle valve 18'. Passageways 4 permit the water flow from second chamber 36 into infusion chamber 5.

It can be seen that the valve stems of the individual valves described above have a cross sectional configuration to allow flow from one chamber to another when in an unseated (or open) position, and the needle valve 18 is adjustable for varying the size of inlet orifice of chamber 39.

At first, before steady state is reached, in the infusion stage, i.e. when cam 32 is in the second operative position (viz., the position in which cam 32 unseats valve 16), the pressure in chamber 36 and in infusion chamber 5 is very low and increases only gradually because adjustable needle valve 18 chokes the flow of water. Eventually, a pressure is reached, which pressure is considerably lower than the pressure of for example 1.5 atm. existing in the heat exchanger 1, in response to which the valve 17 opens. The valve 34 opens with the valve 17. The opening of the valve 17, whereby the water is released into chamber 38 and therefrom eventually out the nozzle 56 relieves the pressure in the infusion chamber, causing it to fall toward zero. However, the size of the valve openings and the strength of the springs is such that the pressure in the infusion chamber gradually rises to a steady state value of about 8 atm., i.e., the dispensing pressure. When, it is desired to cease dispersing coffee, cam 32 is moved to its first operative position (FIG. 3). Valve 16 is closed and, accordingly, no more water flows to the infusion chamber. Furthermore valves 17 and 34 are held very open to permit the release through nozzle 56 of residual liquid in the infusion chamber.

In FIG. 3, $a > b$. Accordingly, in a sense valve 34 could be said always to be in an unseated position. However, as is apparent from FIG. 3, dimensions "$a$" and "$b$" are very close; accordingly, when valve 17 is in a seated position, valve 34 is so nearly completely seated that it is designated "seated." This slight difference in dimensions is provided to facilitate the release of liquid from chamber 38, the pressure of which obviously is lower than the pressure in chamber 36.

Figure 4:
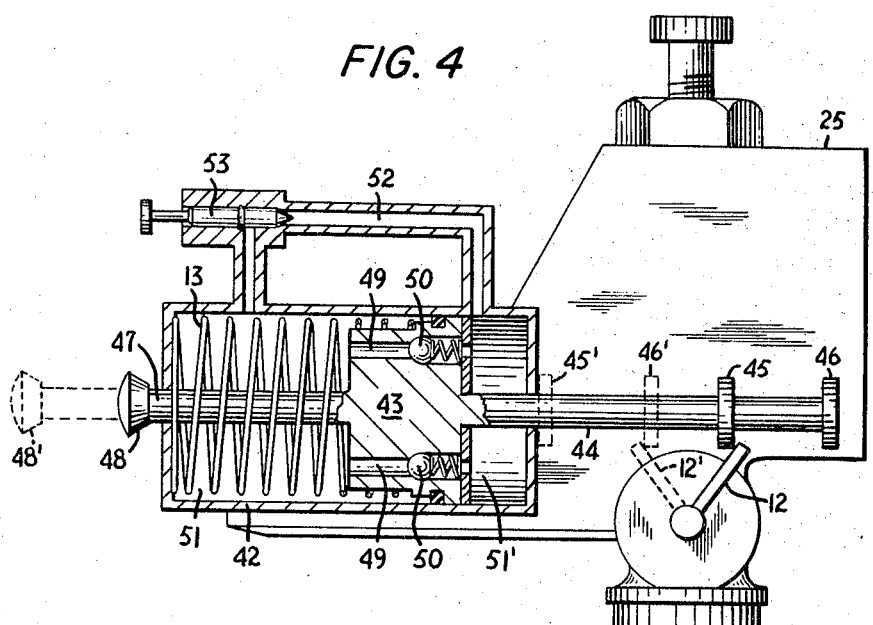
FIG. 4 is a median sectional view through the controlling unit, laterally connected with the body of a dispensing head, shown in elevation.

According to this other aspect of the present invention, with reference to FIG. 4, to the body 26 is laterally connected a control delivery unit, as described in applicant's copending application Ser. No. 188,154, filed Apr. 17, 1962, now abandoned. Valve 16 is seated when cam 32 is in the position illustrated in FIG. 3 and the lever 12 is in the position shown in solid lines in FIG. 4, whereas the valve 16 is unseated (opened) when cam 32 is in the other position than that shown in FIG. 3 and lever 12 is in the position shown in broken lines and designated 12'. The control unit is provided with a hydraulic cylinder 42 which is fluid-filled and in which is reciprocally disposed a piston 43. The piston has a piston rod 44 connected thereto and extending outwardly through one end of the hydraulic cylinder 42 through a fluid-tight seal in the hydraulic cylinder 42. This piston rod is provided with two stops 45, 46, axially spaced apart from each other, between which the free end of the lever 12 is disposed. The stops actuate lever 12 to operate cam 32 to an open and/or to a closed position of valve 16. When the stops are in the position illustrated in solid lines, valve 16 is closed and when the stops are in the position shown in broken lines 45', 46', lever 16 is thrown to the position 12' in which valve 16 is opened. In order to open valve 16 when making coffee, a piston rod 47 is provided at the opposite side of the piston 43 and extends through the opposite end of the hydraulic cylinder 42. The free end of the piston rod 47 is provided with a manually operated knob 48. In order to open valve 16, the knob 48 is manually moved to the position shown in broken lines 48'. Since the hydraulic cylinder 42 is fluid-filled, passageways 49 connect the opposite sides of the piston 43 and one-way check valves 50, normally seated in the position shown, allow fluid flow from chamber 51 of the cylinder to the opposite chamber 51' as the piston 43 is moved toward the left when the knob 48 is manually moved to position 48. When piston 43 is manually moved toward the left, it is moved against the action of a biasing spring 13 constantly biasing run piston 43 toward the right and, thus, toward a position corresponding to the closed position of valve 16. For timing the closing of valve 16, there is provided a passageway 52 located exteriorly of the cylinder and in communication with interior chambers 51 and 51'. A regulating needle valve 53 is provided in the passageway 52 to variably control flow of the hydraulic fluid in passageway 52, thereby to variably set the closing of the valve.

Turning now to the means for starting and stopping the electric motor of the type above-mentioned, these means are described in the U.S. Patent No. 3,119,322.

According to the present invention, the said electric motor starting and stopping means can be provided with a rotatable shaft disposed along the bodies 25, a switch in the circuit of the motor 8 positioned to be actuated by said shaft upon rotation of said shaft, said shaft being provided with cams (one cam for each body 25), the lever 12 being positioned to engage the corresponding cam to rotate said shaft to actuate said switch and energize said motor upon movement of lever 12 to open valve means 16, said shaft being rotatable solely by lever 12.

Figure 5:
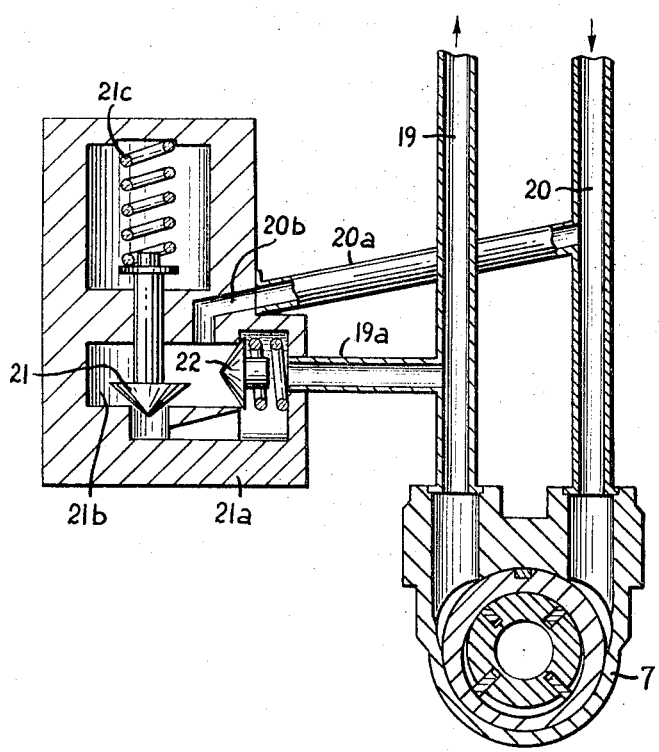
FIG. 5 is a fragmentary median sectional view of a particular pump with a maximum pressure valve of the balance type.

With reference to FIG. 5, in order to further help maintain the dispensing pressure constant and, therefore, to attain a further improvement in the apparatus of the present invention, the arrangement illustrated in FIG. 5 is provided, in which 21 indicates a maximum pressure valve of the balanced type, located in a casing 21a, which controls the maximum pressure in the delivery pipe 19 of the pump 7 communicating with the supply pipe 29. 20 is the inlet pipe of the pump, which is connected to a fresh water source, e.g., to a water main. The pipe 20 is connected also to the balancing space 21b of the valve 21 by way of a pipe 20a and inlet port 20b and the balancing space is connected to the delivery pipe 19 of the pump 7 by way of a pipe 19a under the control of a spring loaded non-return valve 22, the valve 22 thereby controlling the maximum pressure in the inlet pipe 20. The maximum pressure valve 21 is a spring loaded safety valve and normally held on its seating under the influence of a spring 21c. The valve 22 is similarly spring loaded.

By this arrangement, the working pressure of the coffee-making machine is no longer effected by differences in pressure in the water main.

In addition, when initially putting the coffee-making machine into operation, one or more of the recirculation circuits may be filled by opening a direct connection between the water main and the one or more recirculation circuits to be filled. A much more rapid filling is thereby achieved than would be possible with the pump operating, the pump having a very low capacity.

With the coffee-making machine according to the present invention, the operator has nothing to do but place the cups under the respective dispensing head and move the corresponding knob 48 toward the left. After a few seconds (e.g., 20–22) the cups will be filled exactly, neither less nor more than full, with a suitably heated, creamy beverage, which is acceptable by the most exacting requirements of the general public. In addition, the machine is designed to operate with low water and electrical consumptions and the optimum output from the ground coffee, while not requiring costly maintenance.

What I claim and desire to secure by Letters Patent is:

1. In a coffee-making machine having a water boiler, in combination, at least one recirculation circuit comprising a heat exchanger disposed upright in said boiler for extracting heat therefrom and heating water in said circuit, a coffee delivery head having an infusion chamber chargeable with coffee, a manually operable valve for controlling delivery of water from said heat exchanger to said delivery unit, a pump connected to supply water to said circuit and connected to a source of water, conduit means communicating between said pump and said heat exchanger for supplying water from said pump to said heat exchanger, said conduit means opening in the heat exchanger nearer the lower end than the upper end of the heat exchanger, said circuit further comprising conduit means communicating externally of the boiler between the lower end of the heat exchanger and said valve and conduit means communicating externally of the boiler between the upper end of the heat exchanger and said valve, an electric motor driving said pump, and a timing and control unit connected to control and time the interval said valve is open in the absence of manual force holding said valve in an open condition.

2. In a coffee-making machine having a water boiler, in combination, at least one recirculation circuit comprising a heat exchanger disposed upright in said boiler for extracting heat therefrom and heating water in said circuit, a coffee delivery head having an infusion chamber chargeable with coffee, a manually operable valve for controlling delivery of water from said heat exchanger to said delivery unit, a pump connected to supply water to said circuit and connected to a source of water, conduit means communicating between said pump and said heat exchanger for supplying water from said pump to said heat exchanger, said conduit means opening in the heat exchanger nearer the lower end than the upper end of the heat exchanger, said circuit further comprising conduit means communicating externally of the boiler between the lower end of the heat exchanger and said valve and conduit means communicating externally of the boiler between the upper end of the heat exchanger and said valve, an electric motor driving said pump, and a timing and control unit connected to control and time the interval said valve is open in the absence of manual force holding said valve in an open condition, said timing and control unit having means for variably retarding the closing of said valve.

3. In a coffee-making machine having a water boiler, in combination, at least one recirculation circuit comprising a heat exchanger disposed upright in said boiler for extracting heat therefrom and heating water in said circuit, a coffee delivery head having an infusion chamber chargeable with coffee, a manually operable valve for controlling delivery of water from said heat exchanger to said delivery unit, a pump connected to supply water to said circuit and connected to a source of water, conduit means communicating between said pump and said heat exchanger for supplying water from said pump to said heat exchanger, said conduit means opening in the heat exchanger nearer the lower end than the upper end of the heat exchanger, said circuit further comprising conduit means communicating externally of the boiler between the lower end of the heat exchanger and said valve and conduit means communicating externally of the boiler between the upper end of the heat exchanger and said valve, an electric motor driving said pump, a timing and control unit connected to control and time the interval said valve is open in the absence of manual force holding said valve in an open condition, and a maximum pressure valve on said pump.

4. In a coffee-making machine having a water boiler, in combination, at least one recirculation circuit comprising a heat exchanger in said boiler for extracting heat therefrom and heating water in said circuit, a coffee delivery head having an infusion chamber chargeable with coffee, a manually operable valve for controlling delivery of water from said heat exchanger to said delivery unit, a pump connected to supply water to said circuit and connected to a source of water, conduit means communicating between said pump and said heat exchanger for supplying water from said pump to said heat exchanger, an electric motor driving said pump, and a timing and control unit connected to control and time the interval said valve is open in the absence of manual force holding said valve in an open condition, said heat exchanger being disposed transversely of said boiler inclined from the vertical somewhat to cause thermosiphon recirculation of water in said recirculation circuit, said heat exchanger comprising an outer tube and a water discharge nozzle defined by said conduit means and extending axially into said tube less than one-half the length of said outer tube as measured from the lower end of said outer tube, said circuit further comprising conduit means communicating externally of said boiler between the lower end of said outer tube and said valve and conduit means communicating externally of said boiler between the upper end of said outer tube and said valve.

References Cited by the Examiner

UNITED STATES PATENTS

| 319,874 | 6/1885 | Antal et al. | 122—33 |
| 2,412,428 | 12/1946 | Rockwell et al. | 137—535 |
| 2,434,771 | 1/1948 | Mueller et al. | |
| 2,599,151 | 6/1952 | Baldwin. | |

FOREIGN PATENTS

| 808,538 | 2/1959 | Great Britain. |
| 584,965 | 11/1958 | Italy. |
| 613,186 | 11/1960 | Italy. |

WALTER A. SCHEEL, *Primary Examiner*.

STANLEY P. FISHER, *Assistant Examiner*.